UNITED STATES PATENT OFFICE.

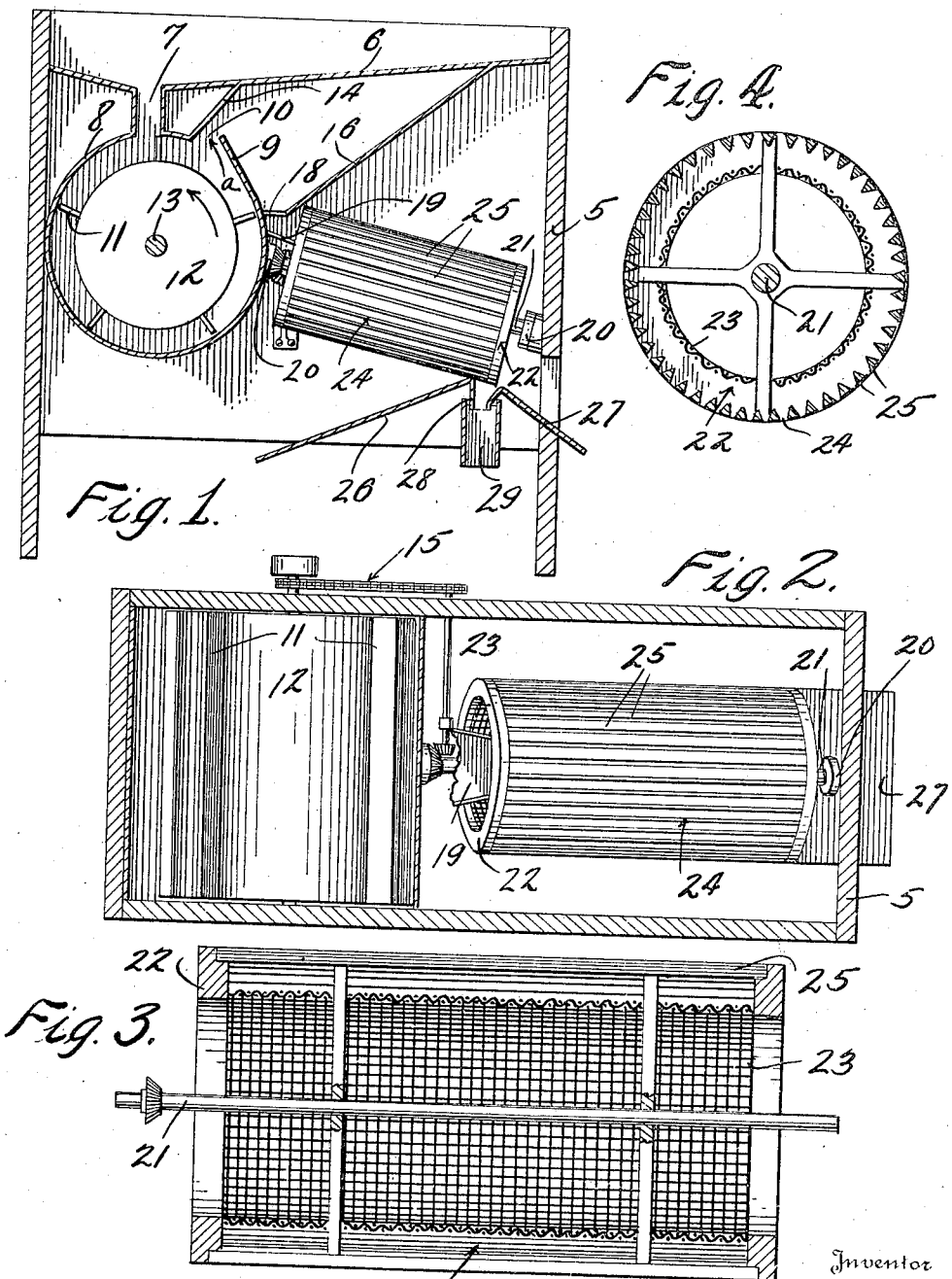

JOHN T. HUSTON, OF COLUMBUS, GEORGIA.

BEAN-HULLING MACHINE.

1,325,989. Specification of Letters Patent. Patented Dec. 23, 1919.

Application filed June 21, 1917. Serial No. 176,176.

*To all whom it may concern:*

Be it known that I, JOHN T. HUSTON, a citizen of the United States, residing at Columbus, in the county of Muscogee, State of Georgia, have invented certain new and useful Improvements in Bean-Hulling Machines; and I do hereby declare the following to be a full, clear, and exact description of the invention, such as will enable others skilled in the art to which it appertains to make and use the same.

This invention is an improvement in separators and has particular reference to a velvet bean hulling machine.

It is well known that the hulls of velvet beans are very tough and difficult to remove. Machines have been designed for hulling the beans in which rotary tooth carrying cylinders have been employed, but in such machines it has been found that the hulls must be literally ground to free the seed and owing to the toughness of the hulls considerable power is required to remove the same.

It is therefore the object of my invention to provide an improved machine for hulling the beans wherein grinding of the hulls is avoided, it being observed that a positive grinding or crushing of the hulls need not necessarily be entailed in splitting or separating the halves of the hulls at their joints to release the beans, and it is more particularly the object to effect this splitting of the hulls to release the beans by subjecting the hulls, when in loose relation to each other, to impact at one side only of each hull and of sufficient violence to split the hull, whereby crushing of the hulls incidental to or subsequent to splitting impact is avoided, with a consequent saving of the power necessarily consumed in such crushing action.

Another object is to provide a machine of this character which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a longitudinal section of the machine constructed in accordance with the invention.

Fig. 2 is a horizontal section with certain parts of the mechanism in plan.

Fig. 3 is a longitudinal section through the separating drum.

Fig. 4 is a transverse section through the separating drum.

The drawing illustrates what is now believed to be a preferred form of the invention which comprises a frame 5 consisting of a plurality of uprights having mounted at the upper ends thereof a feed hopper 6 adapted to receive velvet beans and from which the same are fed to the hulling and separating mechanism through the outlet opening 7 adjacent the rear and transversely of the machine. Preferably disposed beneath the outlet 7 is a stationary cylinder 8 having its wall flared as indicated at 9 to provide an opening 10 through which the beans are thrown by a plurality of rotary carrying and throwing elements 11 in the form of blades preferably secured longitudinally to a rotary drum 12 mounted upon the shaft 13 extending transversely of the frame. Supported beneath the hopper 6 and in the path of movement of the beans, as the same are thrown through the outlet opening 10 by the blades 11 is a stationary hull breaking member 14 preferably formed of a flat plate and disposed at an angle to said path of movement of the beans. The drum 12 is revolved at a considerable speed by the driving mechanism generally indicated by the numeral 15 so that the beans will be thrown with great force through the opening 10 and against the plate 14 as indicated by the arrow "*a*." The force of the blow upon the bean will split the hull thereof along its seams and thus separate the same from the seed and owing to the inclination of the plate 14 the hull and seed will both be thrown upwardly against the bottom of the hopper 6 and will then fall upon the inclined bottom 16 of a second hopper or chamber 17 the other portion of the bottom of which is formed by the adjacent part of the casing 8, said hopper being also provided with an outlet opening 18 in the bottom thereof through which the hulls and beans pass on to an inclined platform 19 from which the same are fed into the separating mechanism.

The frame 5 is preferably provided with the supporting bearings 20 arranged in different horizontal planes and having journaled therein the inclined rotary shaft 21 carrying the separating drum 22 which preferably includes the inner and outer sifting cylinders 23 and 24 respectively. These cylinders are foraminous and the inner cylinder is preferably, though not necessarily, formed of wire mesh, the openings of which are large enough for the seed, small pieces of the hull and other incidental particles, due to the hulling process, to pass through and fall upon the outer sifting cylinder 24. This latter cylinder is preferably formed of a plurality of spaced longitudinally extending bars 25, triangular in cross section, the spaces between the same being smaller than the diameter of the seed so as to prevent said seed from falling through but permitting all other small particles to pass between the bars and fall upon the rearwardly inclined chute 26 and thus be emptied into any suitable receptacle disposed beneath the frame. The large hulls pass downwardly upon the interior of the sifting cylinder 23 and through an opening in the lower end of the drum 22 from whence the same fall upon the forwardly inclined chute 27.

The seed pass to the lower end of the bars 25 forming the cylinder 24 and are dropped through a spout 28 into a delivery chute 29 supported by the frame in a vertical position and adapted to have connected thereto a suitable receptacle for receiving said seed.

What is claimed is:—

A machine for hulling beans and the like, comprising a hopper, a cylindrical casing disposed thereunder and in communication at its upper portion with the bottom of the hopper for the passage of material from the hopper into the casing, a drum rotatable in the casing, propeller blades on the drum, said casing being provided in its upper portion at one side of its point of communication with the hopper with a discharge opening, the wall portion of the casing below said discharge opening being inclined outwardly tangentially of the periphery of the casing, a breaking plate extending from the top of the casing at the inner side of the discharge opening to the bottom of the hopper and adapted to receive thereagainst material discharged centrifugally from the propeller blades and a hopper bottom plate extending from the main hopper bottom to a point adjacent the wall of the cylinder casing forming in conjunction therewith a hopper for the broken hulls and released beans thrown against the breaking plate.

In testimony whereof I affix my signature in the presence of two witnesses.

JOHN T. HUSTON.

Witnesses:
T. J. JOHNSON,
T. W. MALLOY.